United States Patent
Hsu et al.

(10) Patent No.: US 8,582,071 B2
(45) Date of Patent: Nov. 12, 2013

(54) DISPLAY PANEL AND METHOD FOR FABRICATING THE SAME

(75) Inventors: Yao-Hsin Hsu, Hsin-Chu (TW); Bing-Hung Chen, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/423,360

(22) Filed: Mar. 19, 2012

(65) Prior Publication Data

US 2012/0175057 A1 Jul. 12, 2012

Related U.S. Application Data

(63) Continuation of application No. 12/769,932, filed on Apr. 29, 2010, now Pat. No. 8,184,255.

(30) Foreign Application Priority Data

Jul. 10, 2009 (TW) .............................. 98123490 A

(51) Int. Cl.
*G02F 1/1339* (2006.01)

(52) U.S. Cl.
USPC ......................................... 349/154; 349/153

(58) Field of Classification Search
USPC .................................. 349/153–154
See application file for complete search history.

(56) References Cited

U.S. PATENT DOCUMENTS

| | | | |
|---|---|---|---|
| 5,335,103 | A | 8/1994 | Kim |
| 6,562,175 | B1 | 5/2003 | Lin et al. |
| 2005/0128423 | A1 | 6/2005 | Katsura |
| 2007/0184612 | A1 | 8/2007 | Chan et al. |
| 2008/0137024 | A1* | 6/2008 | Nagami et al. ................ 349/154 |
| 2010/0002182 | A1 | 1/2010 | Lee et al. |

FOREIGN PATENT DOCUMENTS

| | | |
|---|---|---|
| CN | 1178096 | 12/2004 |
| CN | 1673822 | 9/2005 |
| CN | 101308292 | 11/2008 |
| JP | 2008-275721 | 11/2008 |
| TW | I239418 | 9/2005 |

OTHER PUBLICATIONS

English language translation of abstract of JP 2008-275721 (published Nov. 13, 2008).
English language translation of abstract of CN 101308292 (published Nov. 19, 2008).

(Continued)

*Primary Examiner* — Wen-Ying P Chen
(74) *Attorney, Agent, or Firm* — McClure, Qualey & Rodack, LLP

(57) ABSTRACT

A method for fabricating a display panel is provided. The method includes steps of: disposing a seal on a first substrate, in which a first side of the seal connects in approximately perpendicular to a second side of the seal and has at least one liquid crystal inlet; forming at least one block on the first substrate and between the liquid crystal inlet and the connection of the first side and the second side of the seal, in which there is a space between the block and the first side of the seal when the block is formed; and pressing a second substrate against the first substrate having the seal and the block thereon, such that the block adjoins the first side of the seal after the second substrate is pressed.

9 Claims, 4 Drawing Sheets

(56) References Cited

OTHER PUBLICATIONS

English language translation of abstract of CN 1178096 (published Dec. 1, 2004).

English language translation of abstract of TW I239418 (published Sep. 11, 2005).

English language translation of abstract of CN 1673822 (published Sep. 28, 2005).

* cited by examiner

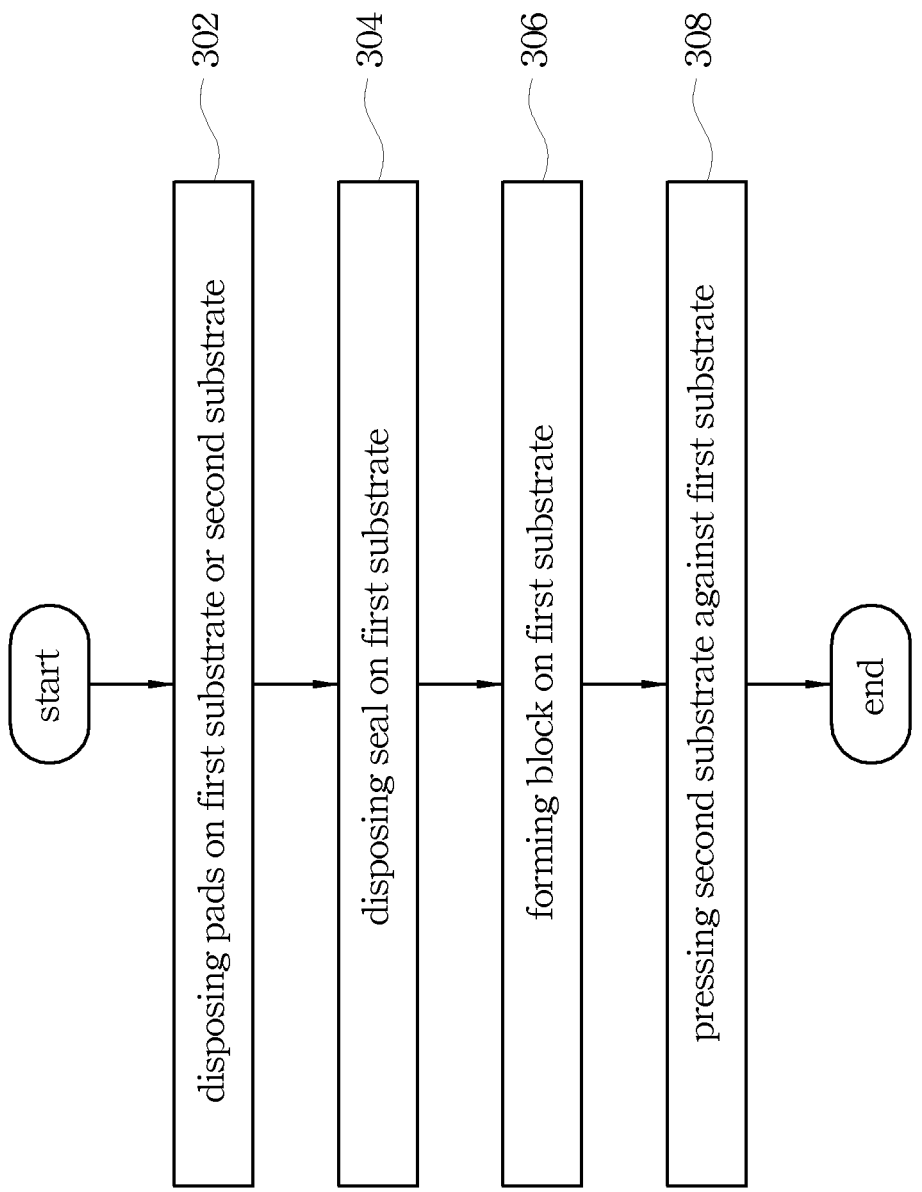

DISPLAY PANEL AND METHOD FOR FABRICATING THE SAME

RELATED APPLICATIONS

The present application is a continuation of application Ser. No. 12/769,932, filed Apr. 29, 2010, entitled "DISPLAY PANEL AND METHOD FOR FABRICATING THE SAME", now U.S. Pat. No. 8,184,255; which claims priority to Taiwan Patent Application Serial Number 98123490, filed Jul. 10, 2009. All of these applications are incorporated herein by reference.

BACKGROUND

1. Technical Field

The present disclosure relates to a display panel and method for fabricating the same. More particularly, the present disclosure relates to a seal structure used in the display panel and method for fabricating the same.

2. Description of Related Art

In a conventional process of fabricating a display panel, a cell process including the steps of forming an alignment layer, coating a seal, injecting the liquid crystal, etc., is usually used. However, during the process of injecting the liquid crystal, peripheral electrodes of the display panel usually have residual liquid crystal thereon due to the capillarity such that the completed display panel has poor quality. Furthermore, in order to prevent the electrodes from being contaminated, a subsequent clean process is still necessary after the liquid crystal is injected. As a result, it will consume material for cleanness and manpower. And during the cell test process, the electrodes may operate badly due to the contamination. Thus, some physical work would be necessary to sweep the electrodes and the electrodes could be damaged. Moreover, the capillarity causing the liquid crystal to be left at the outer side of the seal also makes a waste of the liquid crystal.

SUMMARY

In accordance with one embodiment of the present invention, a method for fabricating a display panel is provided. The method includes the steps of: disposing a seal on a first substrate, in which a first side of the seal connects in approximately perpendicular to a second side of the seal and has at least one liquid crystal inlet; forming at least one block on the first substrate and between the liquid crystal inlet and the connection of the first side and the second side of the seal; and pressing a second substrate against the first substrate having the seal and the block thereon, such that the block adjoins the first side of the seal after the second substrate is pressed.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows:

FIG. 4 is a flowchart of the method for fabricating the display panel according to one embodiment of the present invention.

DESCRIPTION OF THE EMBODIMENTS

In the following detailed description, the embodiments of the present invention have been shown and described. As will be realized, the disclosure is capable of modification in various respects, all without departing from the disclosure. Accordingly, the drawings and description are to be regarded as illustrative in nature, and not restrictive.

Figure 1:
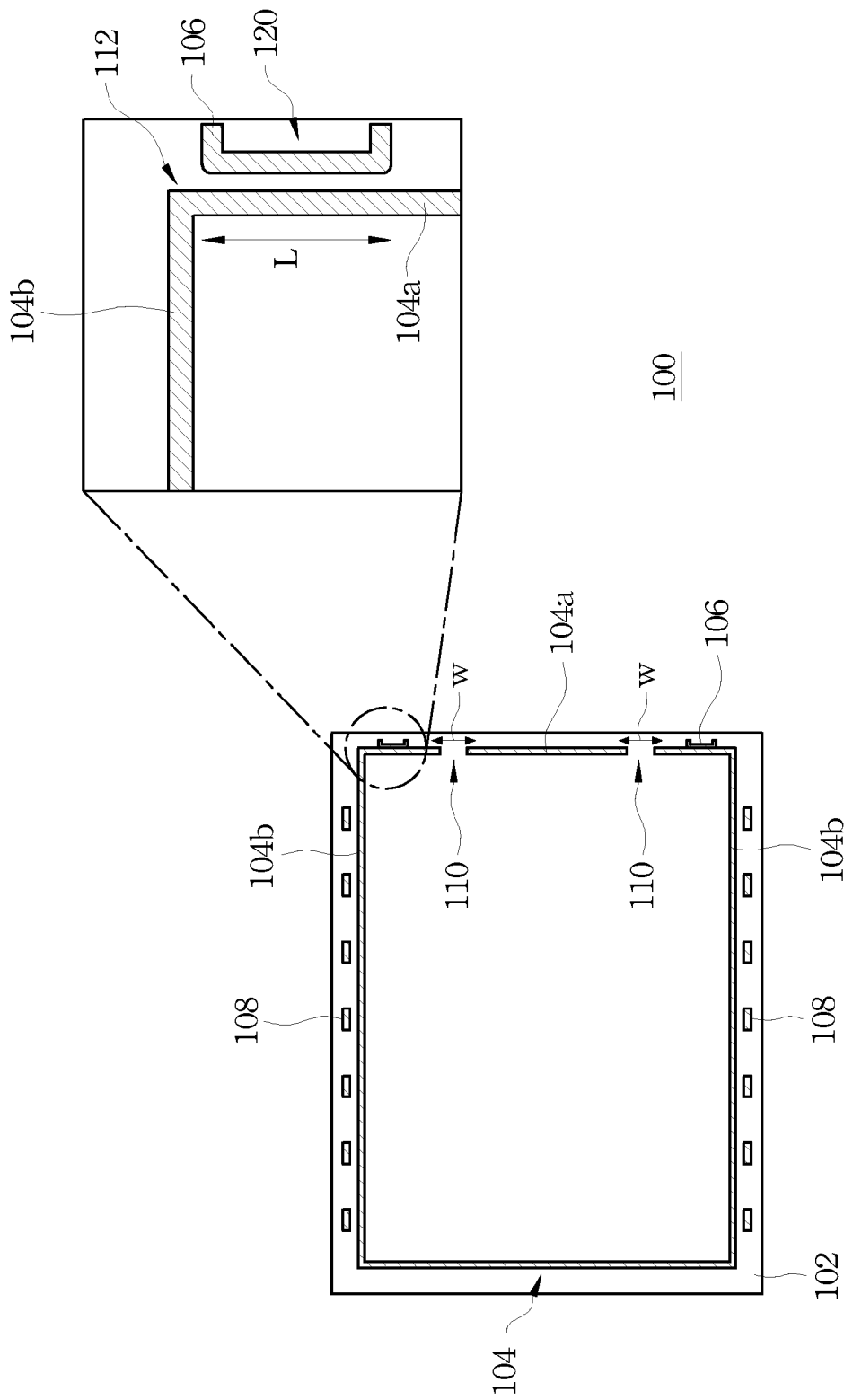
FIG. 1 is a diagram of a substrate structure coated with a seal and its fragmentary enlarged view during a fabrication process of a display panel according to one embodiment of the present invention.

FIG. 1 is a diagram of a substrate structure coated with a seal and its fragmentary enlarged view during a fabrication process of a display panel according to one embodiment of the present invention. As shown in FIG. 1, the display panel 100 can include a first substrate 102, a seal 104, two blocks 106 and several pads 108.

The seal 104 is disposed on the first substrate 102 and mainly used for achieving a sealing effect during the subsequent process of injecting the liquid crystal, so as to prevent the liquid crystal molecules from leaking. In the present embodiment, the first substrate 102 is formed into a shape of a quadrangle, and the seal 104 can be coated on the first substrate 102 in accordance with the shape of the first substrate 102 or the practical demand. The seal 104 has a first side 104a and a second side 104b, in which the first side 104a is formed to have two liquid crystal inlets 110 and connects in approximately perpendicular to the second side 104b. Notably, the amount of the liquid crystal inlets 110 at the first side 104a is not limited to that shown in the present embodiment; that is, in another embodiment, the first side 104a of the seal 104 can be designed according to the practical demand to have single one liquid crystal inlet 110 or even more liquid crystal inlets 110.

The pads 108 are disposed on the first substrate 102 and prepared to be arranged along an outer edge of a predetermined position of the second side 104b of the seal 104, for the electrical connection with associated circuits in the display panel. Moreover, the pads 108 can also be disposed on a substrate disposed opposite to the first substrate 102 (e.g. second substrate 202 shown in FIG. 2).

The two blocks 106 are formed on the first substrate 102 and respectively disposed between the liquid crystal inlet 110 and the connection 112 (i.e. the corner of the seal 104) of the first side 104a and the second side 104b of the seal 104. The material of the blocks 106 can be substantially the same as that of the seal 104. Notably, there may be some space between the blocks 106 and the first side 104a of the seal 104 at this moment, such that the blocks 106 can just adjoin the first side 104a of the seal 104 after the substrate, opposite to the first substrate 102, is disposed on the first substrate 102 to make the blocks 106 compressed by the two substrates. In other words, the space between the blocks 106 and the first side 104a of the seal 104 can prevent the blocks 106 from affecting the seal 104 due to the compression and expansion of the blocks 106. The foregoing space between the blocks 106 and the first side 104a of the seal 104 can be modified according to the practical demand.

Figure 2:
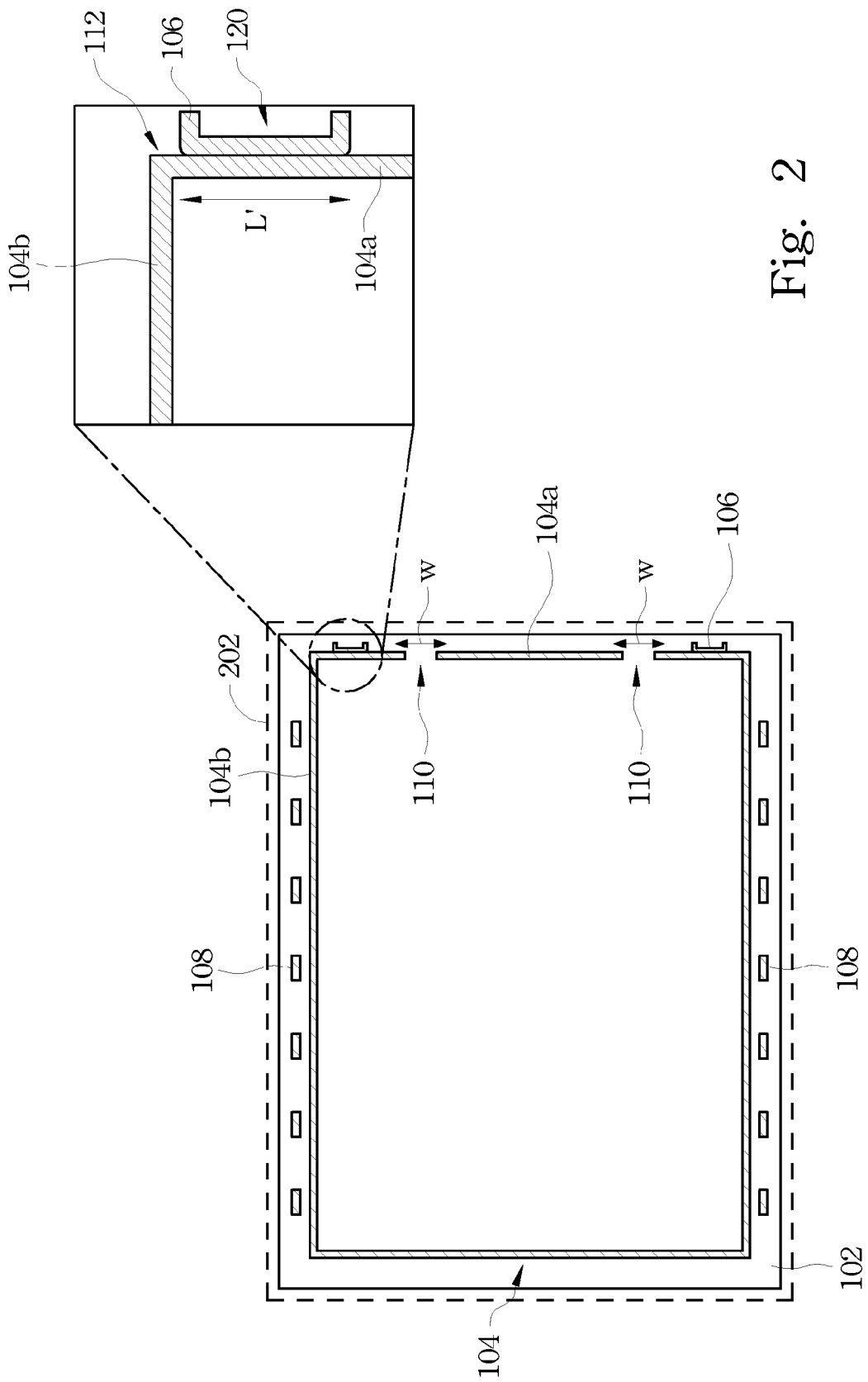
FIG. 2 is a structure diagram of two substrates being pressed against with each other during the fabrication of the display panel according to one embodiment of the present invention.

FIG. 2 is a structure diagram of two substrates being pressed against with each other during the fabrication of the display panel according to one embodiment of the present invention. Compared to FIG. 1, the second substrate 202 is provided to be disposed opposite to the first substrate 102, and the second substrate 202 is pressed against the first substrate 102 having the seal 104, the blocks 106 and the pads 108 thereon, such that the seal 104, the blocks 106 and the pads 108 are disposed between the first substrate 102 and the second substrate 202, and the blocks 106 are compressed to further just adjoin the first side 104a of the seal 104, because the first substrate 102 and the second substrate 202 are pressed against with each other. As a result, when the liquid crystal molecules are injected through the liquid crystal inlets 110, the residual liquid crystal molecules will not directly flow along the first side 104a and second side 104b of the seal 104 to the pads 108 due to the capillarity and will not directly cause the pads 108 contamination; instead, the blocks 106 can avoid the capillarity and can produce a buffering effect to prevent residual liquid crystal molecules to flow through the second side 104b of the seal 104.

In one embodiment, the block 106 is placed adjacent to the connection 112 of the first side 104a and the second side 104b of the seal 104. In another embodiment, the block 106 is not placed adjacent to the connection 112 of the first side 104a and the second side 104b of the seal 104; instead, the block 106 is placed adjacent to the liquid crystal inlet 110 at the first side 104a of the seal 104. In other words, persons skilled in the art can selectively modify the place of the block 106 based on the practical demand and effect to let the block 106 be disposed between the liquid crystal inlet 110 and the connection 112 of the first side 104a and the second side 104b of the seal 104.

In addition, the number of the blocks 106 is not limited to that in the present embodiment; that is, in another embodiment, there can be single one block 106 or even more blocks 106 disposed on the first substrate 102 based on the practical demand.

The block 106 can be formed into the shape of "-", "Π", or a polygon. After the block 106 is formed, at least one side of the block 106 adjoins the first side 104a of the seal 104. In one embodiment, when the block 106 is formed, the block 106 has an opening and an adjoining side, in which the opening is opposite to the adjoining side, and the adjoining side of the block 106 adjoins the first side 104a of the seal 104. For the embodiment in FIG. 2, the block 106 is substantially formed into the shape of "Π" and thus has an opening 120, and the block 106 has a portion opposite to the opening 120 and adjoining the first side 104a of the seal 104. Precisely controlling the quantity of the block coated on the first substrate 102 is difficult, due to the operating restrictions and tolerance of machine or apparatus such that the beginning point and the end point of the coated block would be more irregular compared to other portion of the block, if the block 106 is designed to be in the shape of "Π", the second substrate 202 can be pressed against the first substrate 102 after the coating process, and then the beginning point and the end point of the coated block 106 (i.e. two terminals of the shape "Π") can be removed and only the regular portion of the coated block 106 are left when the pressed substrates are being cut. Accordingly, the block 106 with the shape of "Π" has the advantages of being easily produced and uniformly coated. Furthermore, the block 106 designed to be the shape of "Π" has a larger surrounding area, so it can enhance the buffering effect to prevent residual liquid crystal molecules from flowing through the second side 104b of the seal 104 and to prevent the capillarity.

In addition, in FIG. 2, the length (L') of the block 106 is shorter than the opening width (W) of the liquid crystal inlet 110. In one embodiment, the length (L') of the block 106 ranges from about 3 millimeters to about 20 millimeters. In another embodiment, the length (L') of the block 106 ranges from about 5 millimeters to about 8 millimeters. Moreover, the thickness of the block 106 can approximately equal to that of the seal 104.

Figure 3A:
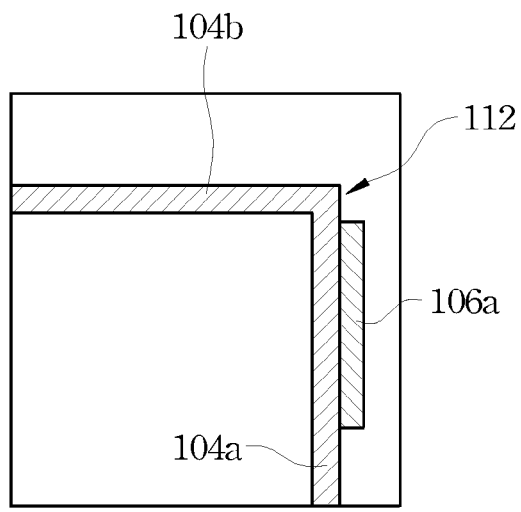
FIG. 3A is a diagram of the block according to another embodiment of the present invention.
Figure 3B:
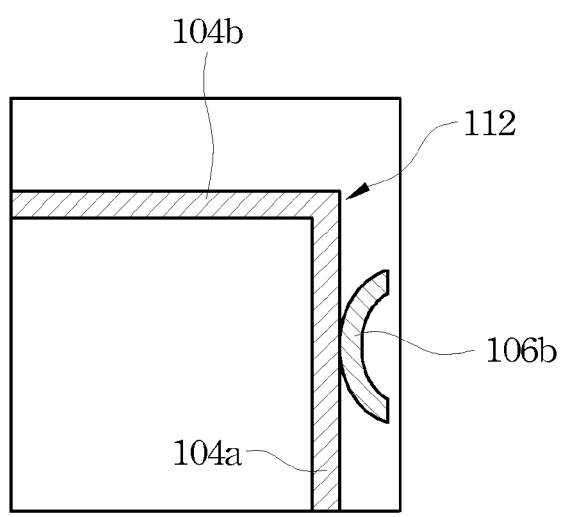
FIG. 3B is a diagram of the block according to yet another embodiment of the present invention.

FIG. 3A is a diagram of the block according to another embodiment of the present invention. Compared to FIG. 2, the block 106a is formed into the shape of "-" which has one longitudinal side adjoining the first side 104a of the seal 104. FIG. 3B is a diagram of the block according to yet another embodiment of the present invention. Compared to FIG. 2, the block 106b is formed into the shape of a semicircle or "U" which has a portion opposite to the opening and adjoining the first side 104a of the seal 104. Moreover, besides the foregoing embodiments, persons skilled in the art can design the block formed into the shape of the polygon or others within the spirit and scope of the appended claims.

FIG. 4 is a flowchart of the method for fabricating the display panel according to one embodiment of the present invention. Refer to FIG. 1, FIG. 2 and FIG. 4. First, a plurality of pads 108 are disposed on the first substrate 102 or the second substrate 202 (Step 302) such that the pads 108 can be arranged along an outer edge of the predetermined position of the second side 104b of the seal 104 when the seal 104 is not coated on the first substrate 102.

Then, the seal 104 is disposed on the first substrate 102 (Step 304), in which the first side 104a of the seal 104 connects in approximately perpendicular to the second side 104b of the seal 104 and has the liquid crystal inlets 110.

After that, the block 106 is formed on the first substrate 102 (Step 306), in which the block 106 is disposed between the liquid crystal inlet 110 and the connection of the first side 104a and the second side 104b of the seal 104, and the material of the block 106 is substantially the same as that of the seal 104.

Afterwards, the second substrate 202 is pressed against the first substrate 102 having the seal 104 and the block 106 thereon (Step 308), such that the block 106 can be compressed to adjoin the first side 104a of the seal 104. As a result, when the liquid crystal molecules are injected through the liquid crystal inlets 110, the residual liquid crystal molecules will not directly flow along the first side 104a and the second side 104b of the seal 104 to the pads 108 due to the capillarity and will not directly cause the pads 108 contamination; instead, the blocks 106 can avoid the capillarity and can produce a buffering effect to prevent residual liquid crystal molecules to flow through the second side 104b of the seal 104.

Similarly, there can be single one block 106 or even more blocks 106 disposed on the first substrate 102 based on the practical demand, and the block 106 can be formed into the shape of "-", "Π", or a polygon. Also, after the block 106 is formed and the two substrates are pressed against with each other, at least one side of the block 106 adjoins the first side 104a of the seal 104. In one embodiment, after the block 106 is formed and the two substrates are pressed against with each other, the block 106 has an opening and an adjoining side, in which the opening is opposite to the adjoining side, and the adjoining side of the block 106 adjoins the first side 104a of the seal 104. For the present embodiment, the block 106 is substantially formed into the shape of "Π" and thus has an opening 120.

In addition, the length (L') of the block 106 can be shorter than the opening width (W) of the liquid crystal inlet 110. As a result, not only the coating time for the block 106 can be saved to increase the yield, but also the used material of the block 106 can saved.

For the foregoing embodiments, the display panel and the method for fabricating the same not only can significantly reduce the contamination for the electrodes or pads, to significantly save the consuming material for cleanness and manpower during the subsequent cleaning process, but also can prevent the electrodes from operating badly due to the contamination during the later process (e.g. cell test), and can thus prevent the electrodes from being contaminated to erode.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A method for fabricating a display panel, comprising:
    disposing a seal on a first substrate, wherein a first side of the seal is connected and approximately perpendicular to a second side of the seal and has at least one liquid crystal inlet;
    forming at least one block on the first substrate and between the liquid crystal inlet and the connection of the first side and the second side of the seal, wherein there is a space between the block and the first side of the seal when the block is formed, wherein a length of the block ranges from about 3 millimeters to about 20 millimeters; and
    pressing a second substrate against the first substrate having the seal and the block thereon, such that the block adjoins the first side of the seal after the second substrate is pressed.

2. The method as claimed in claim 1, before the step of disposing the seal on the first substrate, further comprising:
    disposing a plurality of pads on the first substrate or the second substrate such that the pads are prepared to be arranged along an outer edge of a predetermined position of the second side of the seal.

3. The method as claimed in claim 1, wherein the block has an opening and a third side opposite to the opening, and the third side of the block adjoins the first side of the seal.

4. The method as claimed in claim 1, wherein the block is substantially formed into a shape of "H" and has an opening, and the block has a portion opposite to the opening and the portion of the block adjoins the first side of the seal.

5. The method as claimed in claim 1, wherein the block is substantially formed into a shape of "-", "Π", or a polygon, and the block has at least one side adjoining the first side of the seal.

6. The method as claimed in claim 1, wherein a length of the block is shorter than an opening width of the liquid crystal inlet.

7. The method as claimed in claim 1, wherein the material of the block is substantially the same as that of the seal.

8. The method as claimed in claim 1, wherein a length of the block ranges from about 5 millimeters to about 8 millimeters.

9. The method as claimed in claim 1, wherein a length of the block ranges from about 5 millimeters to about 8 millimeters.

* * * * *